United States Patent [19]

Yousef

[11] 4,114,046
[45] Sep. 12, 1978

[54] ELECTRICAL GENERATOR EMPLOYING NATURAL ENERGY TO POWER SAME

[76] Inventor: Hosni Labib Yousef, Willis Ave., Muttontown, N.Y.

[21] Appl. No.: 766,699

[22] Filed: Feb. 8, 1977

Related U.S. Application Data

[63] Continuation-in-part of Ser. No. 576,168, May 9, 1975, abandoned.

[51] Int. Cl.² .............................................. H02P 9/04
[52] U.S. Cl. ...................................... 290/55; 290/44
[58] Field of Search ................... 310/14; 290/44, 43, 290/54, 55

[56] References Cited

U.S. PATENT DOCUMENTS

| 448,598 | 3/1891 | Wheeler et al. | 310/14 |
| 1,923,971 | 8/1933 | Evans | 290/44 |
| 3,730,643 | 5/1973 | Davison | 290/55 |

Primary Examiner—Robert K. Schaefer
Assistant Examiner—John W. Redman
Attorney, Agent, or Firm—Gregory J. Battersby

[57] ABSTRACT

This invention concerns an improved turbo-electrical generator powered by the conversion of natural energy into mechanical energy in order to propel ferromagnetic blocks about an irregularly, non-circular shaped closed loop track, alternately entering and passing through a plurality of electromagnets positioned about the track. As these blocks enter and pass through these electromagnets, their magnetic flux is maximized and then minimized and this change is converted into useable A.C. voltage. Means are taught for the conversion of solar energy, wind energy and wave energy into the necessary mechanical energy to propel these blocks about the closed loop. An alternative embodiment employs a rotatable, ferromagnetic cross shaped device which is rotated about a center axis by the passage of the blocks about the track. As the device is rotated, its extremities enter and pass through the electromagnets positioned about the track.

13 Claims, 17 Drawing Figures

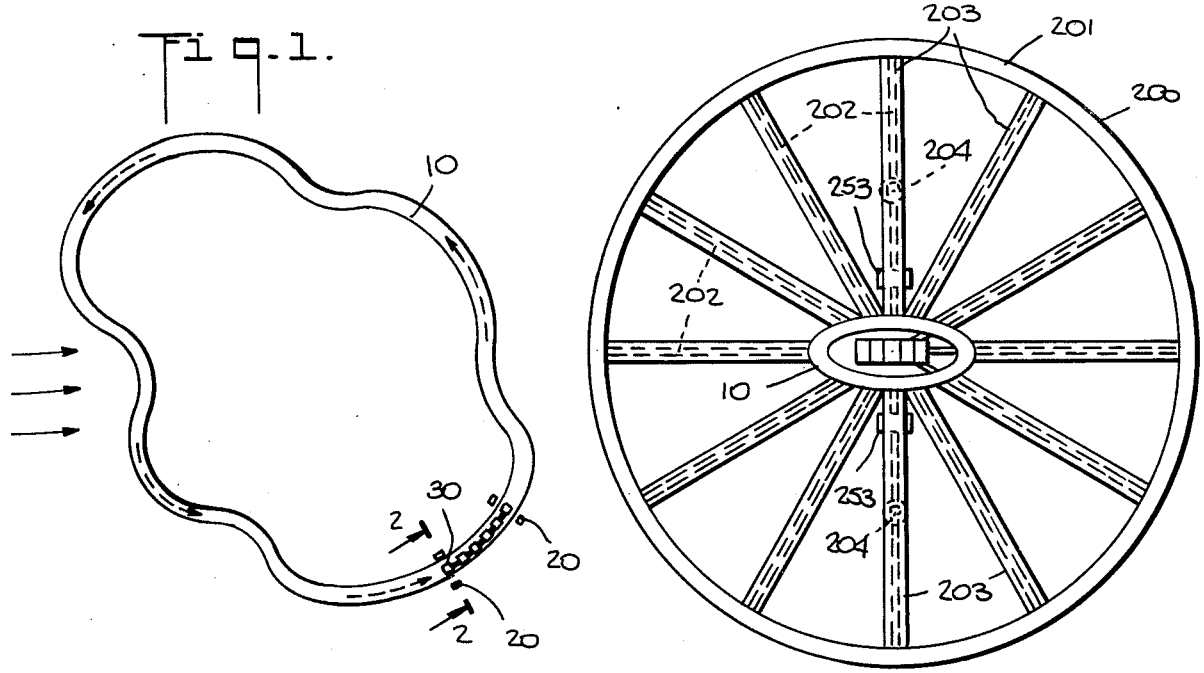
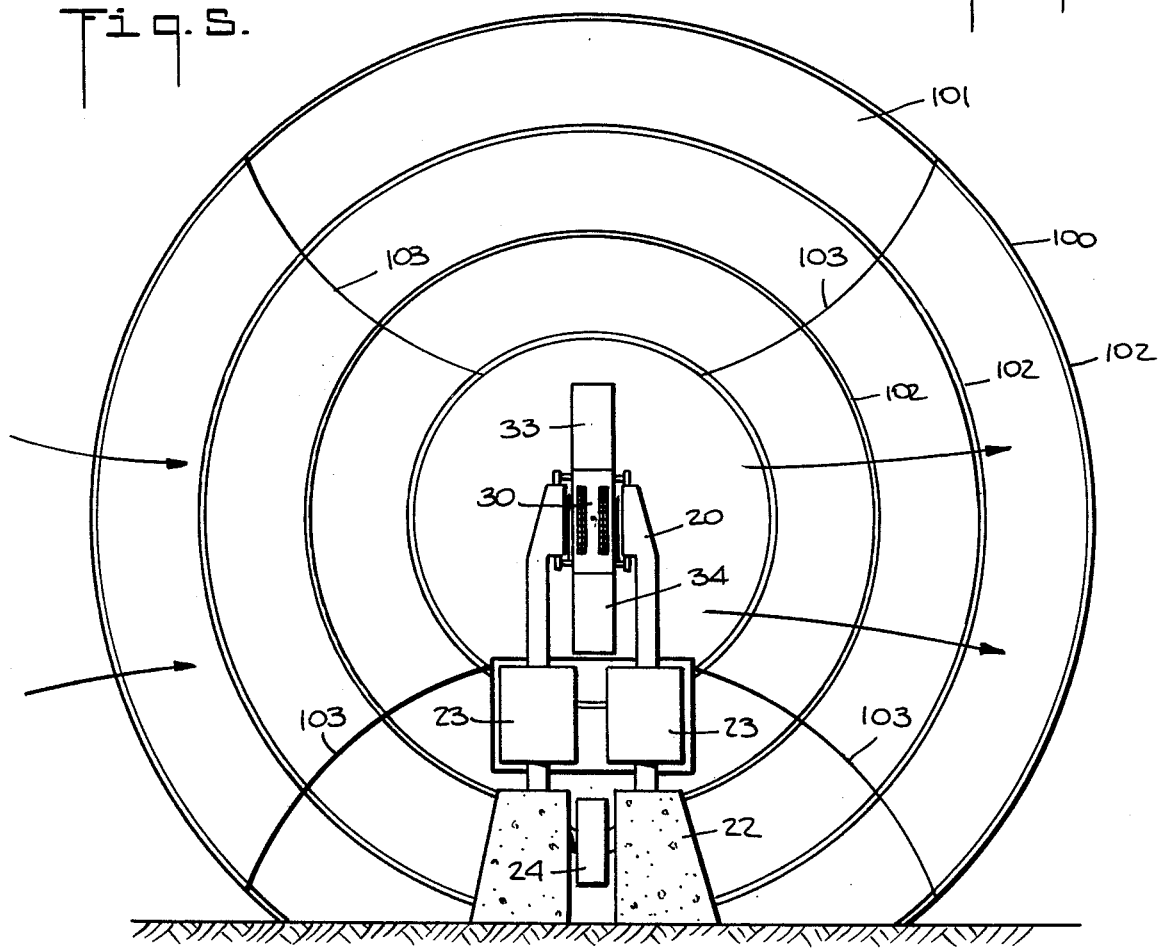

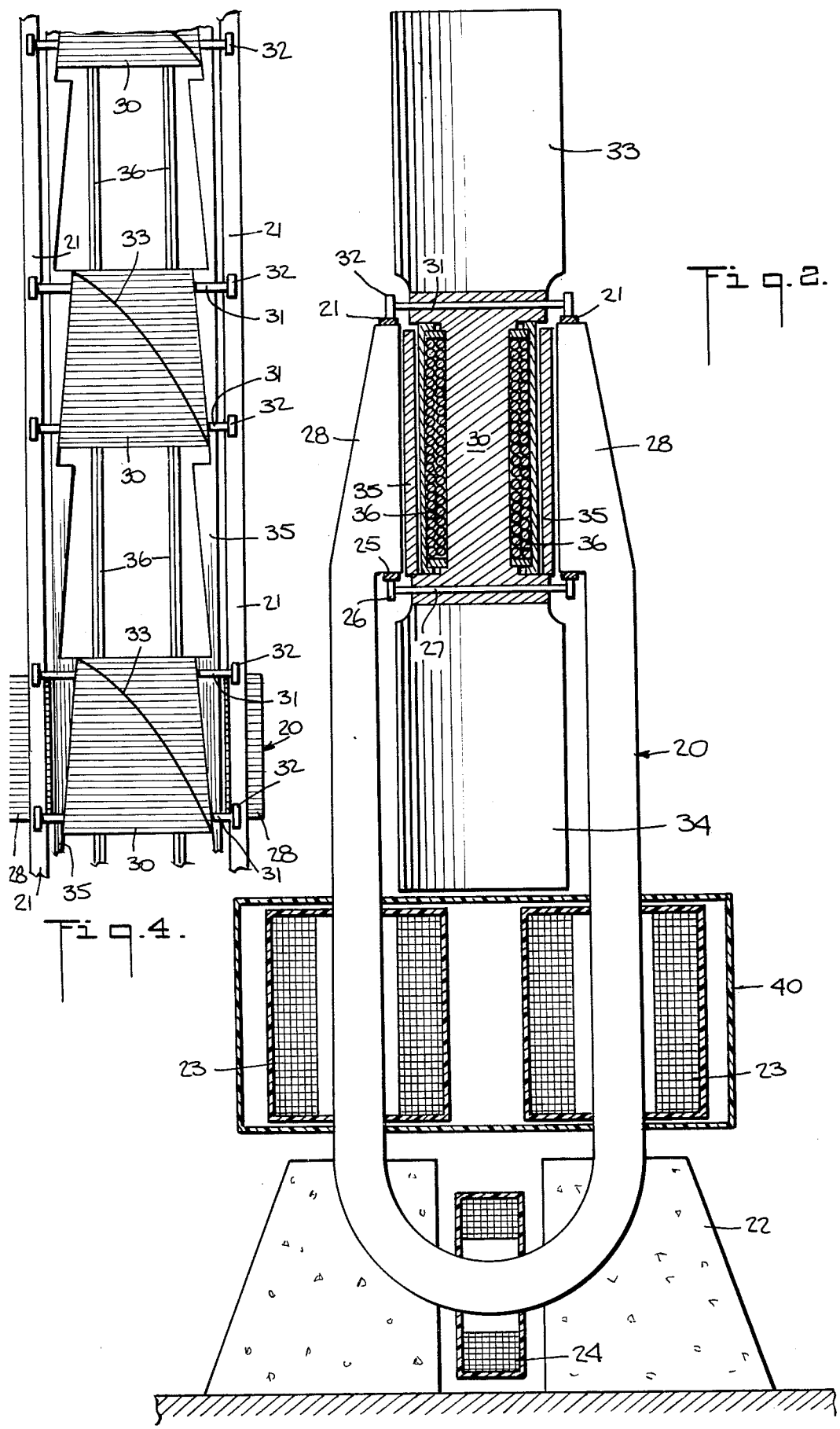

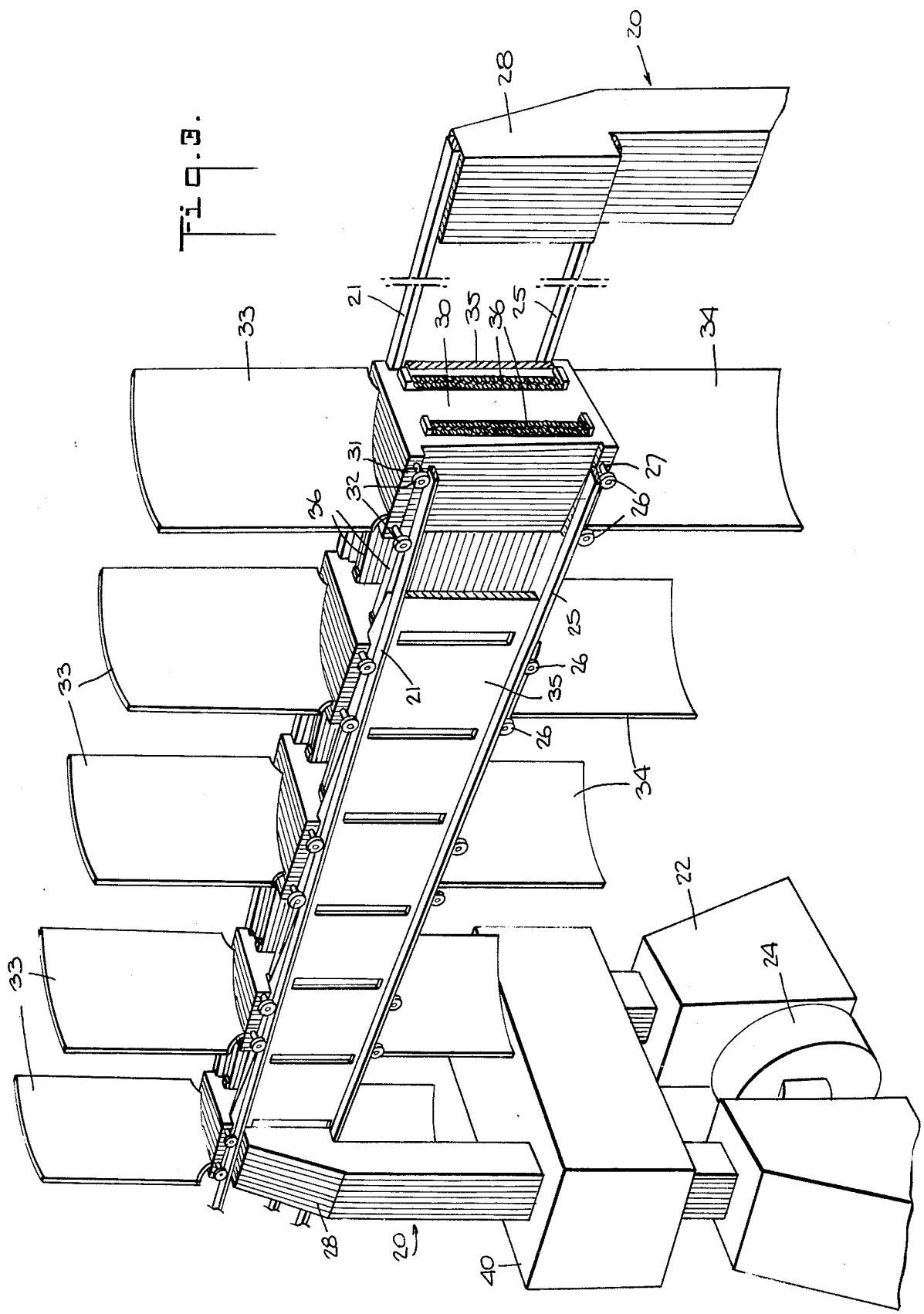

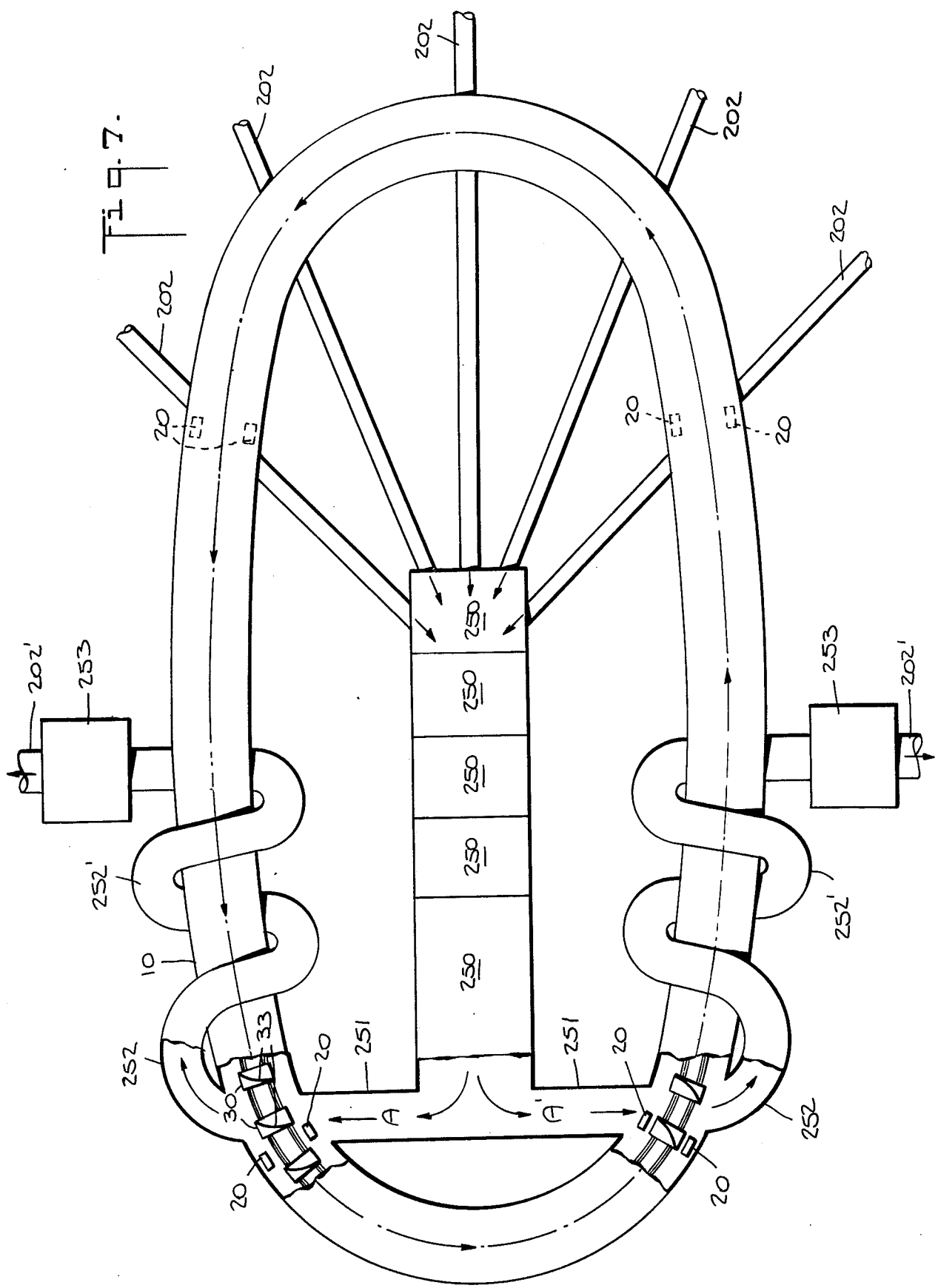

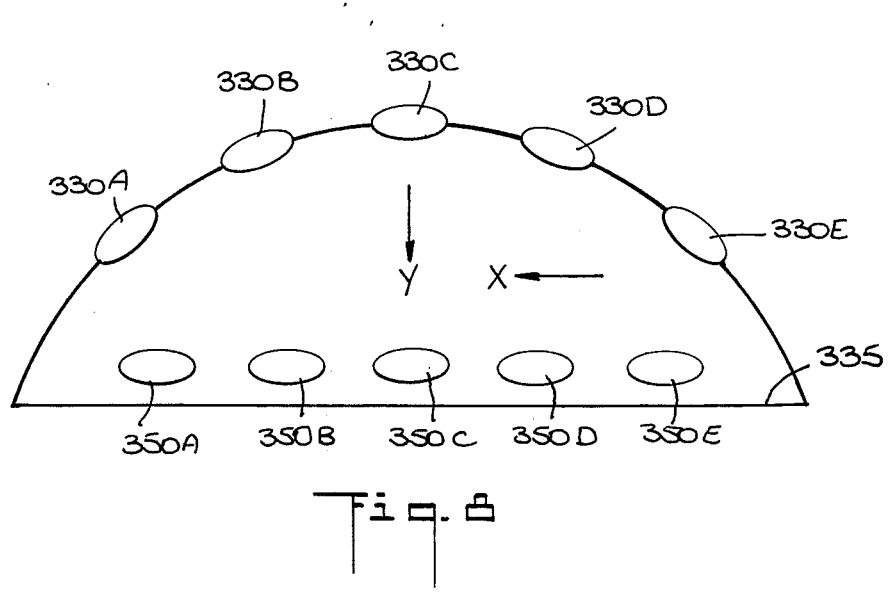

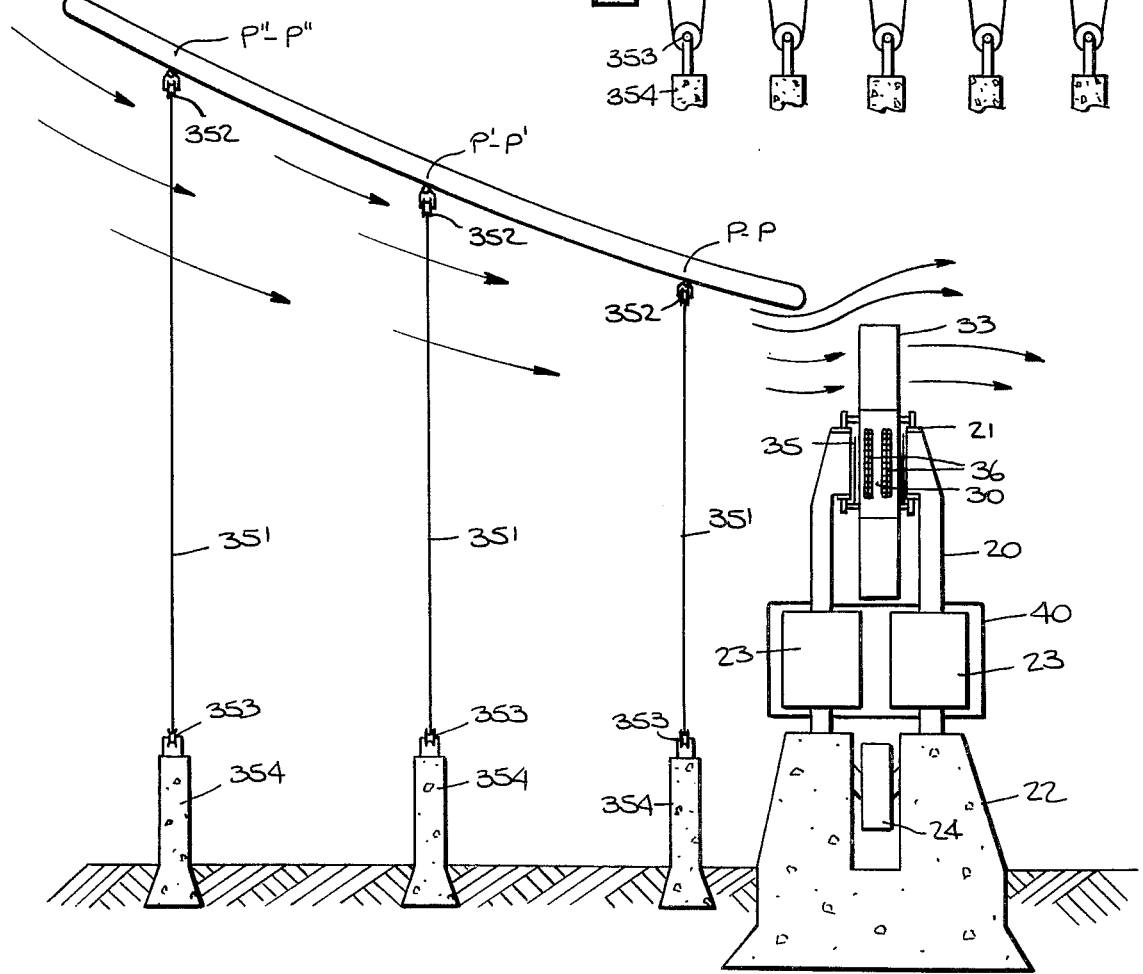

ELECTRICAL GENERATOR EMPLOYING NATURAL ENERGY TO POWER SAME

RELATED APPLICATIONS

This application is a continuation-in-part application of Ser. No. 576,168 filed on May 9, 1975 and now abandoned.

BACKGROUND OF THE INVENTION

This invention relates to an improved electrical generator and, more particularly, it concerns novel means of powering such a generator relying on the conversion of natural energy such as, for example, solar energy, wave energy and wind energy into electrical energy. In this regard, the present invention employs little or no fossil fuel as its energy source. As such, in an age of limited supply and spiraling costs of such fuels, the present invention presents an economical and highly efficient alternative to electrical generating means heretofore employed.

The present invention is particularly suitable for use in electrical generating plants supplying electrical energy to large metropolitan areas. Typically, these generating plants employ a power plant to power the actual electrical generator. The amount of power provided by the power plant has a direct bearing on the amount of electrical energy produced by the electrical generator. Moreover, the cost of producing this power is directly reflected in the cost of the end product—namely useable electrical energy. Therefore, in those instances where electrical generators are powered by relatively inexpensive, yet reliable means, the cost of useable electrical energy is porportionally reduced.

In the past, numerous techniques have been used to produce the necessary power to drive the massive electrical generators of the type employed to supply the electrical power to large cities. Traditionally, four basic sources of power have been and currently are utilized. The first relies on the conversion of thermal energy into mechanical energy by means of steam or gas powered turbines. A second means employs the conversion of thermal energy into mechanical energy by means of internal combustion engines using diesal or gasoline fuels to power them. A third type utilizes kinetic energy generated by the force of falling water and converts this into mechanical energy to power hydroelectric turbines. The fourth approach is the more recent use of nuclear energy to power steam turbines. While each of these well known and commonly accepted powering means has heretofore provided adequate power to drive such electrical generators, none represent the ideal power source Most present numerous disadvantages, either from an economical, environmental or safety viewpoint.

Those systems which depend on any type of fossil fuel are faced with spiraling costs and limited availability. The principal fuels employed, namely coal, natural gas and petroleum and its derivitives are no longer the inexpensive and readily available commodities they had once been. Further, as the more readily available sources of these fuels become depleted, their costs will rise even further as more sophisticated and thus more expensive methods are employed to recover them from the depths of the earth.

Power plants which rely on the kinetic energy generated by the force of falling water have recently attracted more attention. Due however, to the limited sites where these power plants may be constructed, their construction and development costs have proven particularly high, especially when compared to fuel powered generators. As such, the number of such plants built annually is very small when compared to the number of fuel powered plants constructed during a like time period.

In recent years, many power companies have been investigating the use of, and actually constructing nuclear power plants to supply the energy for the massive generators required to power large cities. It has been found that the fission and fussion of complex nuclei materials liberate enormous quantities of energy. This method has attracted a great deal of public attention due to the claim by many environmentalists that such plants, and particularly the emissions and discharges therefrom, have a deleterious effect on the surrounding environment.

Means of harnessing natural energy to drive electrical generators have been explored in the past, however, for one reason or another, most methods of powering electrical generators of the magnitude needed to create electrical enery for large, metropolitan cities have been discounted. Specifically, methods of converting wind, energy, wave energy and solar energy into the mechanical energy required to power such generators have been investigated, however, the magnitude and complexity of harnessing such natural energy have heretofore presented an obstacle to its conversion into electrical energy. Little work has been done with respect to wave and solar energy and the employment of wind energy has advanced little since the Dutch windmill.

SUMMARY OF THE INVENTION

The present invention briefly comprises an apparatus for generating electrical energy which consists of a closed loop track supported by a plurality of horseshoe shaped electromagnets containing at least two poles. These electromagnets, which are fabricated out of any ferromagnetic material, are positioned at fixed intervals about the track.

A plurality of interconnected ferromagnetic blocks of fixed size and configuration are positioned about the track at fixed distances from one another and are adapted to be driven about the track between the poles of the electromagnets by the mechanical energy derived from the conversion of natural energy. In this manner the blocks alternately enter and pass through, at fixed distances, these electromagnets which alternately maximizes and then minimizes the magnetic flux in each of these electromagnets upon the introduction of D.C. voltage through exciting coils. Power coils are provided on each of these electromagnets to transport the A.C. voltage thus generated to suitable storage and delivery means.

Means are provided for the conversion of such natural energy as wind energy, wave energy and solar energy into the necessary mechanical energy required to propel these blocks about the closed loop track. Wind energy is harnessed by the use of one or many wind concentrating frames. Wave energy is utilized by the employment of wave generating devices used in conjunction with one or more floating matrixes to control the height and direction of the waves. Solar energy is used employing a spoked network where water is heated to its boiling temperature and evaporated, with the resultant steam being harnessed to propel the blocks about the track. An alternative embodiment is taught wherein a rotatable, ferromagnetic, cross-shaped device is positioned within certain U-shaped portions of the track. The passage of the blocks about the track causes rotation of the cross shaped device, the extremities of which are then caused to alternately pass through the poles of the electromagnets.

There has thus been outlined rather broadly the more important features of the present invention in order that the detailed description of the invention which follows may be better understood and in order that the present contribution to the art might be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other methods and structures for carrying out the several purposes of the invention. It is important that the claims be regarded as including equivalent methods and constructions as do not depart from the spirit and scope of the invention.

DESCRIPTION OF THE DRAWINGS

Certain specific embodiments of the invention have been chosen for purposes of illustration and description and are shown in the accompanying drawings forming a part of the specification, wherein:

FIG. 1 is an elevational view showing the closed loop track about which the generator is constructed;

FIG. 2 is an enlarged view taken along line 2—2 of FIG. 1 showing one of the plurality of blocks contained within one of the plurality of the horseshoe shaped electromagnets;

FIG. 3 is a prospective view showing a portion of the plurality of blocks in relationship to a portion of the plurality of electromagnets;

FIG. 4 is a top view showing the relationship of a portion of the plurality of blocks and a portion of the plurality of electromagnets;

FIG. 5 is a view of an embodiment of the present invention wherein wind energy is employed to power the electrical generator;

FIG. 6 is a top view of another embodiment of the present invention which employs solar energy to power the generator;

FIG. 7 is a greatly enlarged top view of the central portion of FIG. 6;

FIG. 8 is a view showing the placement of the wave generating devices;

FIG. 9 is a top view of a floating matrix used in the embodiment wherein wave energy is employed to power the generator;

FIG. 10 is a sectional view taken along line 10-10 of FIG. 9 and is illustrative of the manner in which the matrix is used to control wave height;

FIG. 11 is an end view of FIG. 10 showing the manner in which the matrix actually converts wave energy into kinetic energy by controlling wave height;

DESCRIPTION OF THE PREFERRED EMBODIMENTS

Figure 7A:
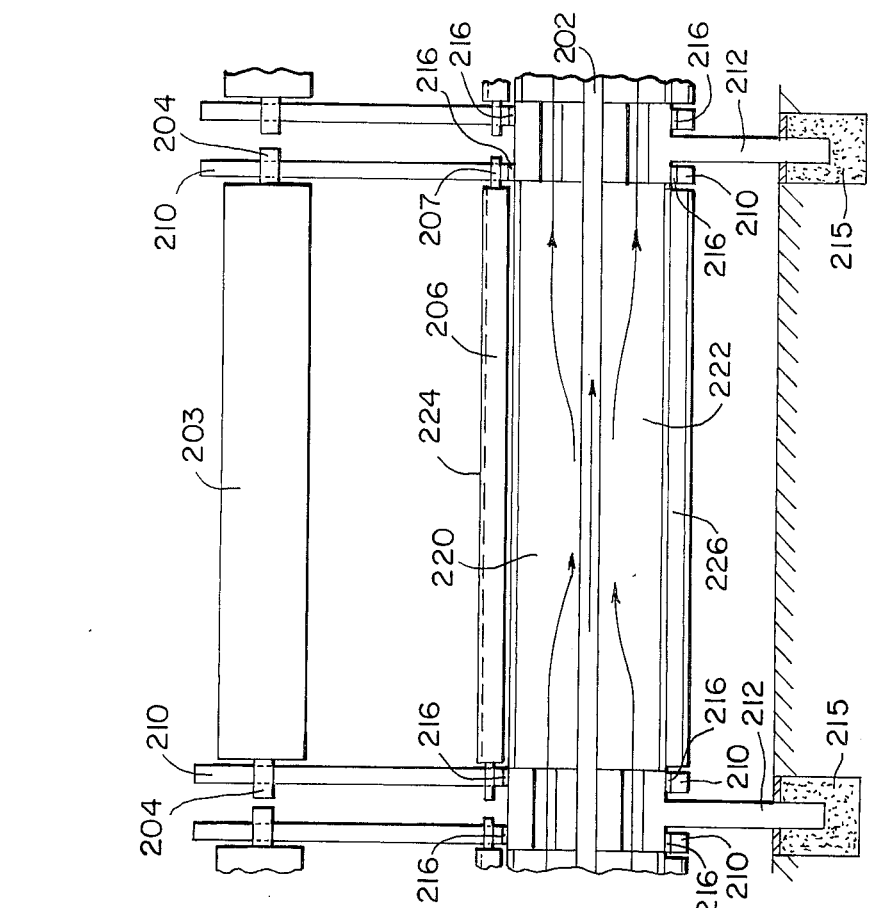
FIG. 7A is a side view of a portion of the solar generator of FIG. 7.

FIG. 1 is illustrative of the placement of a closed loop track 10 about which a continuous chain of uniformly shaped blocks 30 is adapted to travel in such a manner as to alternately enter and pass between the poles of a plurality of horse-shoe shaped electromagnets 20 positioned at fixed locations about the track 10. While the track 10 may take any axial or non-axial shape, a non-axial, irregular, non-circular shape is preferred in that such a shape offers the greatest flexibility in both construction and utilization of natural energy to power the blocks 30 about the track 10. Such an irregular, non-circular configuration requires no wholesale ground leveling as had heretofore been required for the construction of conventional turbo-electrical generators. Moreover, since the track 10 may be virtually any magnitude, an irregular, non-circular track is economically more desirable.

The horse-shoe shaped electromagnets 20, each containing two poles 28, are positioned at regular intervals about the track. The electromagnets 20 are spaced apart approximately every 20 or 40 meters so as to adequately support a pair of continuous, substantially parallel rails, upper rail 21 and lower rail 25 which comprise the track 10. As shown in FIG. 2, the upper rail 21 and the lower rail 25 are positioned respectively above and below the poles 28 of the plurality of the electromagnets 20. This affords greater stability and uniformity as the plurality of blocks 30 pass about the track 10. The blocks 30 are supported on and adapted to travel about the track 10 on the upper rail 21 and the lower rail 25 by means of a set of rotatable wheels or reels, upper reel 32 and lower reel 26, both of which are secured to the block 30 by a pair of axles, upper axle 31 and lower axle 27. The reels 32 and 26 are adapted to ride on the upper rail 21 and the lower rail 25, respectively, as the plurality of the blocks 30 travel about the track 10.

The blocks 30 must be ferromagnetic and are preferably fabricated from the same ferromagnetic material as the electromagnets 20, grain oriented steel. The shape of the blocks 30 may vary uniformly. It is preferred, however, that they assume the shape shown in FIG. 3 basically rectangular with a slight taper between the front and the rear portion of the block 30 along its longitudinal extent. Each of the blocks 30 contain a pair of turbine blades, upper turbine blade 33 and lower turbine blade 34, which extent perpendicularly outward from the upper and lower surfaces of the block 30, respectively. Turbine blades 33 and 34 are adapted to receive and convert natural energy into mechanical energy according to the teachings of the present invention. The employment of at least two turbine blades 33 and 34 insures that the mechanical forces imparted on the blocks 30 are well balanced. The turbine blades 33 and 34 may be constructed out of virtually any high strength per weight material, such as, for example, aluminum, titanium or reinforced plastic.

At least two power coils 23 and at least one exciting coil 24 are spirally wound about each of the electromagnets 20, preferably in close proximity to the mounting stands 22. The power coils 23, preferably copper, are adapted to supply an A.C. current in excess of about one thousand amperes. The exciting coil 24, also copper, is adapted to carry to the electromagnets 20 a D.C. voltage of between about 4 and about 10 amperes. Such currents, in combination with the factors and conditions hereinafter described, are sufficient to generate a magnetic flux in the electromagnets 20 of such a magnitude as to, according to the teachings of the present invention, generate useable A.C. voltage.

The blocks 30, as they enter and pass between the poles 28 of the electromagnets 20, are maintained in fixed relationship to the poles 28 by the use of a spacing device 35 as shown in FIG. 4. This spacing device 35 is ferromagnetic and preferably constructed from grain oriented steel. The spacing device 35 assumes a shape complementary to the shape of the blocks 30 and the electromagnets 20. As such, when the blocks 30 are tapered and must pass between the relatively flat poles 28 as in FIG. 3, the spacing device 35 assumes a saw tooth shape on the side in juxtaposition to the blocks 30 and a flat shape on the side in juxtaposition with the poles 28. This is more clearly shown in FIG. 4. In those instances, however, when the shape of the blocks 30 is square or rectangular, the shape of the spacing device 35 would take a correspondingly complementary flattened shape. The use of a spacing device 35 provides constant and uniform spacing between the blocks 30 and the poles 28 of the electromagnets 20 and also keeps any air gap between the two to a minimum, thus facilitating the construction and installation of the generator since there is less of a need to manufacture and install the component parts thereof to the critical tolerances heretofore required.

FIGS. 3 and 4 are illustrative of the manner in which the blocks 30 are interconnected. The blocks 30, which each measure about 40 centimeters in length are spaced about the track 10 approximately every 40 centimeters apart. Connection of the blocks 30 is effected by conventional connection means including, for example, the methods shown in FIGS. 3 and 4 wherein a multiplicity of cables 36 extend continuously about the track 10 passing through the longitudinal extent of each of the blocks 30. As such, mechanical energy need only be introduced upon a small number of the blocks in order to effect movement of the plurality of the blocks 30. The cables 36 may be fabricated out of virtually any material, preferably a ferromagnetic material such as, for example, grain oriented steel. It is conceivable, however, that portion of the cables 36 which extend between the blocks 30, may be fabricated out of a non-ferromagnetic material such as, for example, aluminum. This is especially desirable in those instances when the track 10 is expected to be exposed to particularly corrosive elements such as when the track 10 is constructed in close proximity to the sea. The cables 36 should be of sufficient size and strength to effectively draw the plurality of the blocks 30 about the track 10 against the forces exercised by and on the blocks 30 as they enter and pass between the poles 28 of the electromagnets. It is appreciated that other means of connecting the blocks 30 may be employed such as, for example, the use of aluminum chains, steel bars, or other conventional techniques to effectively interconnect the plurality of the blocks 30.

Cooling of each of the electromagnets 20 is accomplished by the utilization of conventional oil filled containers 40 which are contained about portions of the electromagnets 20, preferably about the power coils 23.

FIG. 3 is a prospective illustration of a portion of the track 10. From this illustration, it is clear that any movement in one of the blocks 30 will result in moving the plurality of the blocks 30 about the track 10. As the blocks 30 travel about the track 10 they alternately enter and pass between the poles 28 of the plurality of the electromagnets 20. When a block 30 is positioned directly between the poles 28 of any one of the electromagnets 20, due to the filling of virtually all of the available air space between the poles 28 with a ferromagnetic material, namely the block 30, the magnetic flux of that particular electromagnet 20 is maximized. As the block 30 passes out from between the poles 28 on its path about the track 10, the magnetic flux in that electromagnet 20 is then minimized due to the re-establishment of an air space between the poles 28 which had formerly been filled by the ferromagnetic block 30. This results in a reduction of the magnetic flux of the electromagnet 20 to practically zero. This continuous alternating cycle caused by the passage of the blocks 30 about the track 10 between the plurality of the electromagnets 20 results in the generation of sinosoidal wave form A.C. current which is collected from the power coils 23 and distributed by conventional means. It is appreciated that this individual reaction, multiplied many times by the plurality of the electromagnets 20 positioned about the track 10, results in an electrical generator capable of generating a huge amount of electrical energy, conceivably in excess of one million kilowatts, with an electrical efficiency greater than about 90%, a mechanical efficiency greater than about 75% and capable of withstanding overloads of up to about 1000%.

The power coils 23 and the exciting coils 24 of the electromagnets 20 are connected in such a manner that the A.C. voltage generated in the power coils 23 becomes cumulative. This is accomplished by the division of the plurality of electromagnets 20 into two electrical phases, each 180° apart. The exciting coils 24 of all of the electromagnets 20 are connected in series, resulting in the cancelation of the A.C. voltage introduced therein. Power coils 23 attached to each electromagnet 20 of each of the two phases, are connected in such a manner as to form an outlet for the two phases. As a result, the current in the two phases undergo a 180° phase shift and the flux across the track 10 cancels. This is accomplished by the positioning of the electromagnets 20 about the track 10 in such a manner that as the series of the blocks 30 of one phase approach the electromagnets 20 of the same phase, they are departing the electromagnets 20 connected to the opposite phase. Such a system minimizes the leakage inductance of the entire generator.

Figure 12:
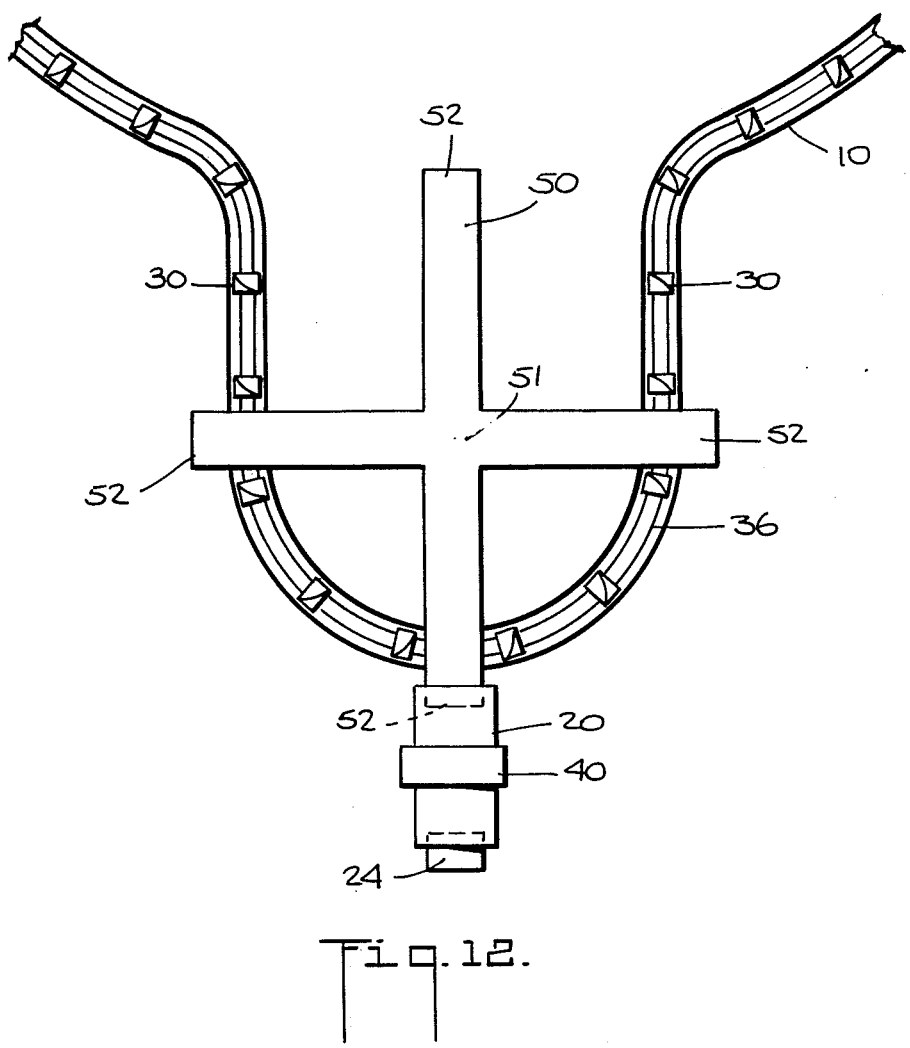
FIG. 12 is illustrative of an alternative embodiment of the present invention depicting the employment of a cross-shaped ferromagnetic device rotatable about a center axis.

The same result may also be accomplished in an alternative embodiment illustrated in FIG. 12, wherein the track 10 is supported by a plurality of conventional supporting devices (not shown) rather than by the electromagnets 20 as in the embodiment of FIG. 1. Additionally, the track 10 includes a plurality of U-shaped portions within which are contained a rotatable, cross-shaped device 50 fabricated out of a ferromagnetic material and rotatable about a center axis 51. The extremities 52 of the cross-shaped device 50, the lengths of which are adjustable, are adapted to intersect the track 10 in such a manner as to pass between the blocks 30 and through the poles 28 of the electromagnets 20 adjacent the track 10.

In this alternative embodiment, the blocks 30 are interconnected in such a manner as to allow the extremities 52 of the cross-shaped device 50 to pass between the blocks 30. This is preferably accomplished by the use of cables 36 positioned only at the upper and the lower portions of the blocks 30, affording sufficient space between the upper and lower cables 36 to allow passage of the extremities 52 therethrough. Additionally, no spacing devices 35 are used.

In the alternative embodiment of FIG. 12, the electromagnets 20 are of the same type and construction as in the embodiment of FIGS. 1-4 however, in this embodiment, the electromagnets 20 are mounted horizontally rather than in a vertical position as in FIGS. 2-4. The poles 28 of the electromagnets 20 are adapted to received the passage of the extremities 52 of the cross-shaped device 50 between each of the poles 28, thus creating the same effect as the embodiment of FIGS. 2-4. The movement of the blocks 30 effect rotation of the cross-shaped device 50, resulting in the alternately entering and passing through of the extremities 52 between the poles 28 of the electromagnets 20. This is especially preferred when the overpower of the generator is under about 200%. The principle advantage of this embodiment resides in its ability to generate greater power of the same frequency with less strain on the generator. This is due to its ability to adjust the lengths of the extremities 52 and, as such, overpower could reach levels between about 400% and 600%.

Figure 15:
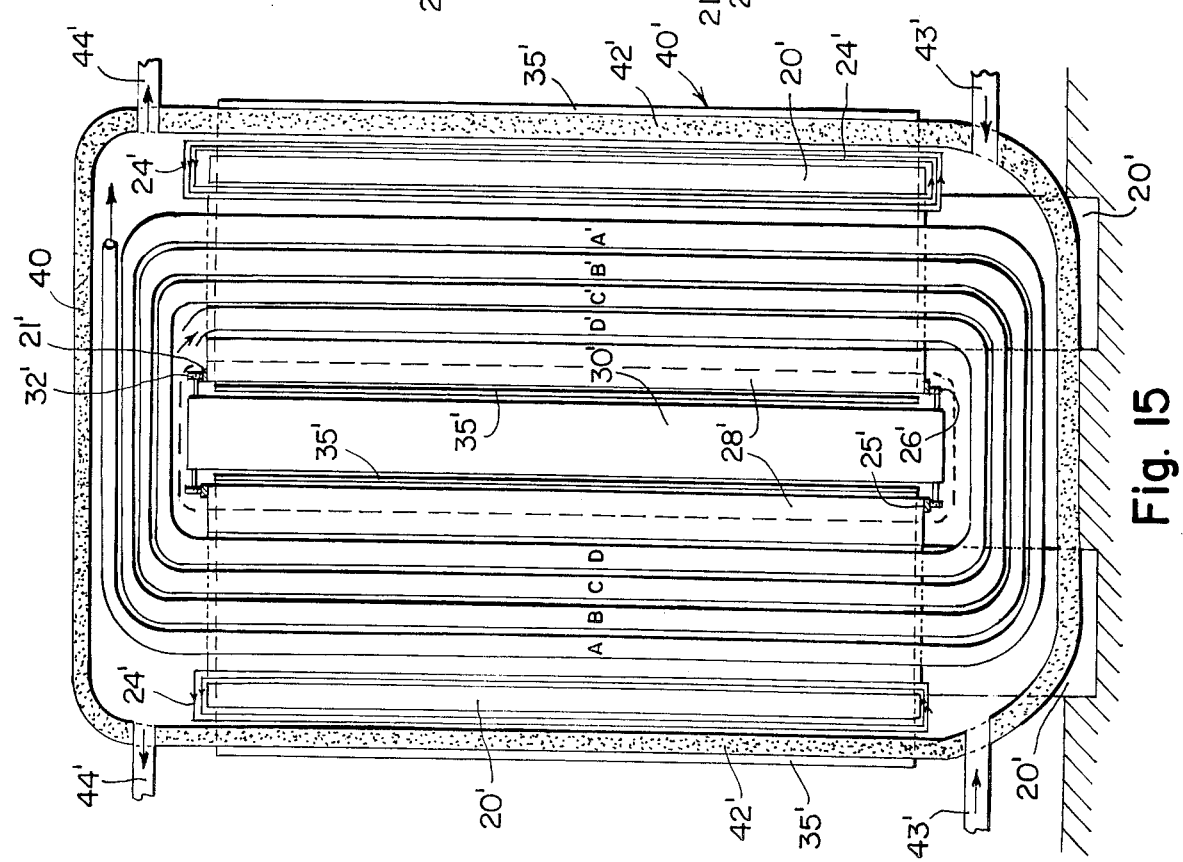
FIG. 15 is a sectioned view taken along lines 15—15 of FIG. 14.
Figure 13A:
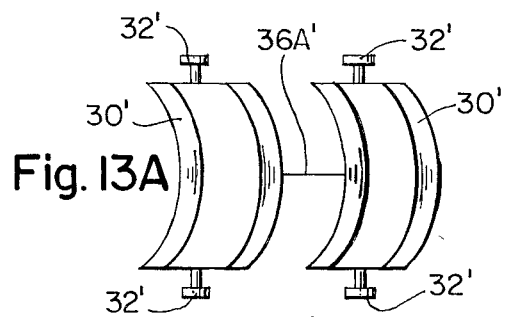
FIG. 13A is a top view of the modified blocks of FIG. 13.
Figure 13:
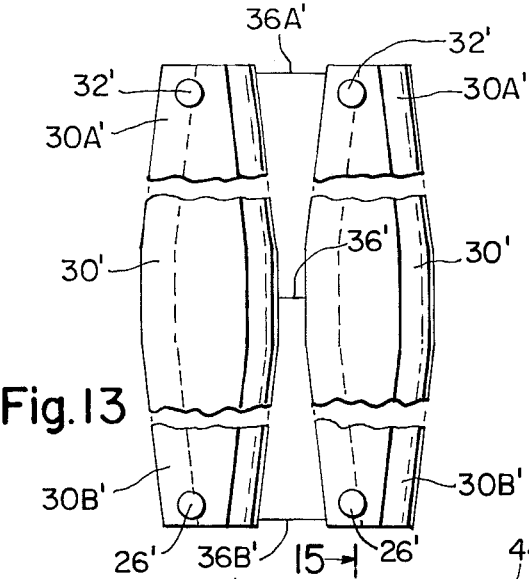
FIG. 13 is a side view of a modified version of the ferromagnetic blocks used in a second alternative embodiment of the present invention.
Figure 14:
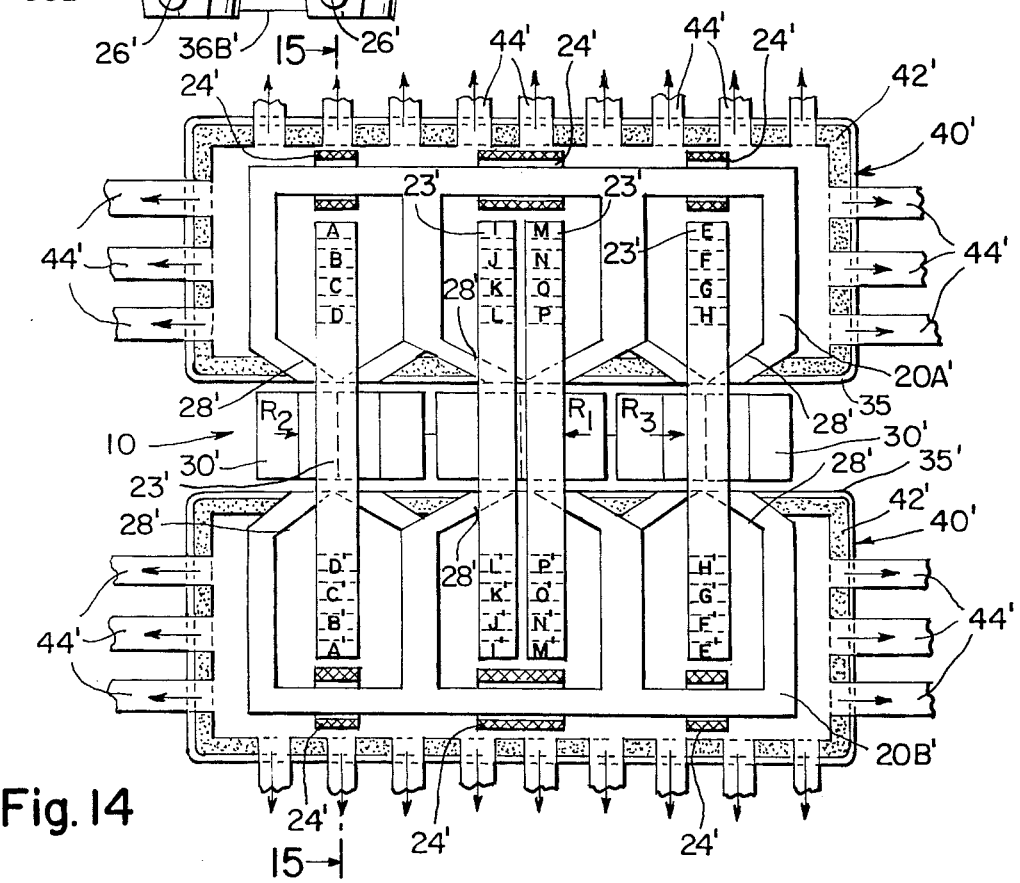
FIG. 14 is a sectioned top plan view of the modified electromagnets used in the second alternative embodiment of the present invention.

A second alternative embodiment is shown in FIGS. 13-15 wherein a plurality of a modified version of ferromagnetic blocks 30' are passed about the track 10 and through a plurality of modified electromagnets 20' in order to generate a magneto-mechanical coupling (m.m.c.) between the magnetic flux of the current in the power coil 23' and the mechanical force driving the blocks 30' about the track 10.

FIGS. 13 and 13A are illustrative of the modified blocks 30' which are of a one piece design and are shaped in a turbine blade-like configuration, preferably fabricated from a ferromagnetic material such as for example, steel. Modified blocks 30' are intended to receive the converted natural energy at both the tapered upper and lower portions 30A' and 30B'. As shown in FIG. 13, modified blocks 30' have a bowed center portion 30C'. The plurality of modified blocks 30' are interconnected by center cables 36' and by upper and lower cables 36A' and 36B', respectively, of similar design as the cables 36 which interconnect the blocks 30 of the previously described embodiment. Upper and lower reels 32' and 26', respectively, are provided for passing the modified blocks 30' about the upper and lower rails 21' and 25', respectively, of track 10 in the same manner as previously described in the first embodiment.

Modified electromagnets 20' are rectangular in shape and, as shown in FIGS. 14 and 15, include two complementary portions 20A' and 20B', positioned on opposite sides of track 10 along which the modified blocks 30' pass. Portions 20A' and 20B' are of a honeycomb-like configuration and are fabricated from a ferromagnetic material. Portions 20A' and 20B' are each contained within a sealed container 40' which is filled with a petroleum based insulating oil.

FIG. 14, which is a partially sectioned top plan view of one of the modified electromagnets 20', illustrates the manner in which the portions 20A' and 20B' are positioned relative to track 10 with the plurality of blocks 30' passing between the portions 20A' and 20B'. Portions 20A' and 20B' each have at least three principle poles 28', each of which includes a series of windings of power coil 23' which are interconnected to the windings of the opposite pole 28' of the complementary portion, the windings passing both above and below track 10.

Each of the portions 20A' and 20B' are encased in a sealed container 40' which includes a concrete outer portion 42' and an outer metal casing 35' encircling a part of the concrete portion 42'. As shown in FIGS. 14 and 15, the inner portion of the container 40' is filled with a petroleum based insulating oil which is introduced through a set of entry ports 42' located at the lower portion of the container 40' and which is removed through a set of exit ports 44' located at the upper portion of the container 40'. The oil serves to cool the power coil 23' and the electromagnets 20' with the heated oil being cooled externally and then re-circulated. The portions of the outer metal casing 35' along the track 10 also serves as a spacing device for the blocks 30' as they pass between the portions 20A' and 20B'. Spacing devices 35' may, if desired, consist of a plurality of rings rather than one single continuous casing as shown in FIG. 14.

Blocks 30' travel between the two portions 20A' and 20B' in a similar manner as in the earlier described embodiment, either grouped as shown in FIG. 14 or spaced apart.

Exciting coils 24' are provided about portions of the electromagnets 20' for supplying a D.C. magnetomotive force (M.M.F.) to the electromagnets and to generate a magnetic flux therein.

As shown in FIGS. 14 and 15, power coils 23' are wound about the poles 28' as individual windings A–D and as complimentary windings A'–D', thus encompassing the modified blocks 30' as they pass along track 10 between the poles 28'. Power coils 23' are fabricated from copper bars and the current generated in the power coils 23' flows around the blocks 30' at least four times and is then directed to external collection means (not shown).

As the blocks approach the poles 28', exciting coils 24' will generate an increasing magnetic flux in that portion of the electromagnet 20' which will generate current in the upward direction in coil windings A through H and I' through P' and in the downward direction in coil windings I through P and A' through H'. The current generated in power coil windings I through P, A through D, and E through H will form fluxes that can be represented by resultant vectors $R_1$, $R_2$, $R_3$, respectively. These fluxes are opposite the direction of magnetization of the blocks 30' between the poles 28' caused by the fluxes created by the exciting coils 24'. Thus the fluxes due to the current in coil 23' acts to push the blocks 30' backwards away from the electromagnets 20'. As the blocks 30' proceed through the electromagnets 20', the currents in the power coils 23' reverse, causing the fluxes represented by resultant vectors $R_1$, $R_2$ and $R_3$ to reverse, to pull back the blocks 30'. In this manner, the fluxes in power coils 23' will constantly oppose the motion of the blocks 30' and thus, by continuously taking power from the blocks 30', will achieve complete magneto-mechanical coupling.

As heretofore stated, the present invention teaches the alternating filling and subsequent voiding of the air spaces between the poles 28 of the electromagnets spaced about the track. One of the novel features of the present invention resides in the manner in which the blocks 30 are driven about the track 10. This novelty lies in the fact that natural energy constitutes the source of the energy to be converted into the necessary mechanical energy to effect movement of the blocks 30. FIG. 5 illustrates the manner in which wind energy is converted into the requisite mechanical energy; FIGS. 6, 7 and 7A are illustrative of the manner in which solar energy is converted into useable mechanical energy; and FIGS. 8–11 show how wave energy may be employed to drive the blocks 30 about the track 10. It is understood that while these figures illustrate the use of these means of conversion individually, they can, of course, when so desired, be combined.

FIG. 5 shows the manner in which wind energy is converted into mechanical energy. In this embodiment, a massive wind concentration frame 100 is constructed about the track 10, enveloping the entire track 10 and the electromagnets 20. The wind concentration frame 100 is so positioned as to concentrate the velocity of the wind from virtually any direction into sufficient velocity to effect movement of the plurality of the blocks 30 by striking the turbine blades 33 and 34 of the blocks 30. Wind velocities of between about 8 meters/second and about 50 meters/second are sufficient to effect such movement. While one wind concentration frame 100 enveloping the entire of the track 10 is sufficient to generate the requisite mechanical energy, it is conceivable that, when desired, a plurality of smaller wind concentration frames (not shown) of the same design as wind concentration frame 100 but of smaller dimension, may be substituted and placed at fixed locations about the track 10 to accomplish the same result. In this regard, each of such wind concentration frames would be directed at a portion of the track 10 directing the wind against the corresponding portion of the blocks as they pass.

The wind concentration frame 100 comprises a sheet-like material 103 supported by a plurality of rings 101 and 102. Sheet-like material 103 is fabricated from a material which is both strong and flexibile, such as, for example, aluminum, and is secured to the rings 101 and 102 at intervals of between about 4 and about 6 meters. The rings 101 and 102 are constructed out of aluminum piping material and are of sufficient thickness to withstand winds in excess of about 100 meters/second. As such, it is preferred that the rings 101 and 102 be at least about 10 centimeters in diameter with a wall thickness of about at least 3 millimeters. The velocity of the wind which passed through the wind concentration frame 100 is increased by a factor of between about 4 and about 6 times its normal velocity and is directed against the turbine blades 33 and 34 of the blocks 30 in order to effect movement of the blocks 30. The wind concentration frame, all encompassing, is capable of concentrating wind from virtually any direction and does not require any mechanical or other adjustments to accomodate any change in wind direction or velocity.

FIGS. 6, 7 and 7A illustrate the embodiment of the present invention wherein solar energy is converted into the mechanical energy required to propel the blocks 30 about the track 10. FIG. 6 shows a network of pipes 200 formed in the shape of a wheel with radially extending spokes which is constructed about the track 10. The network 200 is comprised of a plurality of feed and return pipes 202 which appear as the spokes of the wheel shaped network 200 and which intersect, at fixed positions, circumfrentially extending pipe 201. The network 200 may, when necessary, have a diameter of between about one and about 4 kilometers. Moreover, when desired, and especially when the area on which the track 10 is to be built so dictates, the network 200 may be constructed in the shape of a square, a rectangle, or in virtually any other shape to effect the same purpose.

A plurality of longitudinally extending converging lenses 203, supported by frames as shown in FIG. 7A are positioned above all or part of feed and return pipes 202 with the frames being adjustable so as to alter the position of the lenses 203 to conform to the position of the sun, thus maximizing the effect of the available solar energy.

As shown in detail in FIG. 7A, converging lenses 203 are pivotably mounted on a frame 210 by end portions 204 which are received and retained within apertures in frame 210. Frame 210 is securably mounted to the ground by means of concrete foundation 215 in which are planted support portions 212. Frames 210 are adapted to rotate relative to supports 212 on pivot discs 216 so as to direct the position of the converging lenses 203 directly at the sun. A second lens 206 may be used between converging lens 203 and pipes 202 in order to more effectively concentrate the solar energy on return pipes 202.

Converging lenses 203 may assume virtually any shape although a cylindrical shape is preferred. Converging lenses 203 may be up to about 10 meters in length and about 4 meters in width with a radius of curvature of about 15 meters. Second lens 206 is the same length as converging lens 203 but with a lesser thickness and radius of curvature. Converging lens 203 and second lens 206 are of such configuration as to increase the concentration of solar energy on pipes 202 by a factor of about 400 to 1, thus serving to raise the temperature of the fluid contained within the pipes 202 to about 400° C.

Converging lenses 203 and second lenses 206 are adapted to be adjusted relative to the position of the sun. This may be accomplished by a conventional motor (not shown) which may be controlled for example, by one or more heat sensors (not shown) affixed to return pipes 202.

In order to efficiently operate the solar generator of this embodiment and to preserve the temperature of the fluid passing through return pipes 202, insulating pipes 220 are provided surrounding return pipes 202 through which is passed a heated fluid such as, for example, air, steam or heated water. The temperature and pressure of the fluid which is passed through insulating pipes 220 is about one half that of the fluid passing through return pipe 202. This is due to the fact that they are heated by conduction or radiation from pipes 202. Insulating sheaths 224 and 226 are additionally provided, upper sheath 224 being positioned about second converging lens 206 and lower sheath 226 adjacent lower insulating pipe 222. Insulating pipes and insulating sheaths are fabricated from transparent materials such as, for example, sodium chloride crystals or glass so as to effectively transfer the concentrated solar energy on return pipes 202. The fluid which passes through insulating pipe 220 further serves to function as an insulator so as to retain the heat in pipe 202 and to absorb the radiated heat thus increasing the efficiency of the available energy.

The heated fluid may also be passed through the insulating pipe 220 and directed in such a manner as to drive the blocks 30 about the track 10 at certain points where the temperature and pressure may be relatively low.

The fluid used in the system, preferably water, is circulated throughout the network 200 by means of a circulating pump 204. As the fluid travels throughout the network 200 and especially through the feed and return pipes 202 positioned below the converging lenses 203, the fluid is heated to temperatures approaching or exceeding its boiling point.

As is illustrated in FIG. 7, the heated fluid is then delivered into evaporating chambers 250 where the heated fluid passes over a plurality of sheet-like material composed of relatively inexpensive fibers and is evaporated into a vapor. The vapor is then funneled in the direction of arrows A and A' into at least two delivery pipes 251, portions of which intersect the track 10. In this manner, the vapor passing through the delivery pipes 251 is allowed to contact the turbine blades 33 and 34 of the blocks 30 as they travel through that portion of the delivery pipes 251 which intersect the track 10. The vapor then continues around spirally wound pipe 252 which also intersects the track 10 at portions thereof and again the vapor, being exposed at these portions to the track 10, is allowed again to strike the turbine blades 33 and 34 of the blocks 30 which are, at that time, travelling past that portion of the spirally wound pipe 252; thus further effecting movement of the plurality of the blocks 30 about the track 10. As the vapor continues about the spirally wound pipe 252 its temperature is gradually reduced and is then directed into a condensor 253 wherein the vapor is converted back into liquid form and recirculated through the network 200. Cooling water may be used in the condensor. In an alternative embodiment, not shown, evaporation can be effected in the condensor 253.

The network 200 may take either an open or a closed form. In the closed form, the same fluid is constantly recirculated about the network, with additional fluid being added when necessary. In the open form, after condensation, the fluid may be diverted off for whatever side use desired, with fresh water being constantly circulated.

While virtually any type of fluid may be employed, a gas, fresh water and salt water are preferred. Chemical additives may be added to the fluid when so desired, to lower its boiling point or viscosity. When salt water is circulated, network 200 preferably takes the form of an open system with fresh salt water being pumped into the network 200 directly from the sea. Upon heating and subsequent condensation with the salt water becoming essentially desalinized, the then desalinized water may be diverted off and used for irrigation or other desired uses. This water would then be replaced by the addition of fresh sea water. Additionally, since the salt crystals of the sea water accumulate on the fiberous sheets of the evaporating chambers 250 during evaporation, these sheets may, from time to time, be removed and used for a variety of side-uses, including, for example, their admixture with sand to form construction materials or in the fabrication of lenses or other transparent and/or optical articles. In particular, cylinders composed of such crystal laden sheets may be used for a variety of uses.

In those situations where fresh water is employed as the circulating fluid, the network 200 preferably takes a closed system format with the same water being continuously recirculated. Additional water, when necessary, may be added.

Recognizing that solar energy is only available during limited periods of the time, this embodiment may be combined with other embodiments of the present invention or with other conventional techniques to function effectively even in the absence of solar energy. A preferred energy storing technique for use during non-solar energy times is the positioning of the track 10 adjacent to a reservoir or other body of water. During those periods of time when solar energy is available, the lower and upper turbine blades 34 and 33 of the blocks 30 are adapted to direct a flow of water in to this reservoir from another source of water. The flow is then reversed during non-solar energy times, with fixed abount of the stored water being released and directed to strike the turbine blade 33 and 34 of the blocks 30, thus propelling the plurality of the blocks 30 about the track 10.

A further embodiment of the present invention relies upon the conversion of wave energy into the mechanical energy requred to propel the blocks 30 about the track 10. This embodiment is illustrated in FIGS. 8-11. Waves in large bodies of water are normally generated by the action of the wind and the effect of the moon. Waves with heights of about one meter, when exposed to winds of about 5 meters/second over a distance of about 50 kilometers, are capable of reaching heights of between about 4 and about 5 meters. Winds of that magnitude are present in excess of about 90% of the time.

As shown in FIG. 8, a plurality of wave generators 330A-330E are spaced in a concave shape extending from the shore 335 into the body of water over a radius of between about 40 and about 60 kilometers. When necessary, greater or lesser radii may be chosen. As the waves generated by the wave generators 330A-330E approach the shore, they encounter a series of floating matrixes 350A-350E positioned adjacent to a portion of one or more tracks 10. Floating matrixes 350A-350E are positioned adjacent to the portion of the track 10 so that as the waves generated by the wave generators 330A-330E approach the shore 335, their potential energy will be converted into kinetic energy by the floating matrixes 350A-350E which control and direct the waves against the upper and lower turbine blades 33 and 34 of that portion of the blocks passing around the track 10 portion adjacent to the floating matrixes 350A-350E, thus effecting movement of the plurality of the blocks 30 about the track 10.

Floating matrixes 350 are ring shaped, preferably plastic, and are inflatable. The portion of the floating matrixes 350 in the direction of the wave generators 330A-330E which is adapted to receive the superimposed waves from the direction designated as Z, is divided into fixed sections, preferably three in number as shown for example, in FIG. 9 and indicated as sections P—P; P'—P'; and P"—P". The width of the total matrix may vary between about 40 and about 60 meters. Each of the sections P—P; P'—P'; and P"—P" is secured individually to the bed of the body of water by means of elastic guide wires 351. As shown in FIGS. 10 and 11, each portion contains on its underside, a set of adjustable pulleys 352 which are attached to a corresponding set of pulleys 353 secured to the bed of the body of water by means of attachment mounts 354. The elastic guide wires 351 connect the corresponding sets of pulleys 352 and 353. A counterweight 357 is contained on the end of each guide wire 351 and, by adjusting the weight of the counterweight 357 and the length of each guide wire 351; it is possible to adjust the height that each section P—P; P'—P'; and P"—P" rides in the water. It is preferred that sections P"—P", the section closest to the wave generators 330A-330E be allowed to ride highest in the water; that section P—P, the section furthest away from the wave generators 330A-330E, ride lowest in the water, and that section P'—P', the middle section, be allowed to ride at a height somewhere in between the heights of sections P—P and P"—P".

Floating matrixes 350A-350E serve to control the height of the waves as they prepare to strike the turbine blades 33 and 34 of the blocks 30 as they travel past that portion of the track 10 positioned adjacent to the floating matrixes 350A-350E. In this manner, the force of the waves striking turbine blades 33 and 34 of the blocks 30 effect movement of the plurality of the blocks 30 about the track 10. The employment of floating matrixes 350A-350E serves to gradually reduce the height of the waves as they pass from portion P"—P" to portion P—P, thus converting all of the potential energy of the waves into kinetic energy.

Having thus described the invention with particular reference to the preferred forms thereof, it will be obvious to those skilled in the art to which this invention pertains, after understanding the invention, that changes and modifications may be made without departing from the spirit and scope of the invention as defined by the appended claims.

Wherefore, I claim:

1. Apparatus for generating electrical energy, said apparatus comprising in combination:
   a continuous, non-circular, non-axial track including a pair of continuous, substantially parallel rails;
   a plurality of electromagnets positioned at fixed locations about said track, said electromagnets having at least two magnetically opposite poles, at least one of said poles being located on each side of said pair of rails;
   at least one exciting coil wound about a portion of each of said electromagnets through which is passed a D.C. current to create a magnetic flux in each of said electromagnets;
   at least one power coil wound about a portion of each of said electromagnets and connected for transmission of the generated electrical energy to external collection means;
   a plurality of interconnected ferromagnetic blocks adapted to pass about said non-circular track relative to and at a fixed distance between the opposite poles of said electromagnets to alternately maximize and minimize the flux density present in each of said electromagnets to generate an A.C. current in said power coil, said blocks including oppositely positioned rotatable wheels adapted to ride on the rails of said track and at least one turbine blade-like member to receive natural mechanical energy to effect movement of said blocks about said tracks; and
   means to focus natural mechanical energy towards said apparatus to effect movement of said blocks.

2. The apparatus of claim 1 wherein said blocks are adapted to pass at fixed distances between said opposite poles by means of a ferromagnetic spacing device being generally complimentary to the shape of the blocks and of the poles.

3. The apparatus of claim 1 wherein the electromagnets are horseshoe shaped with two opposite poles.

4. The apparatus of claim 1 wherein the poles of each of said electromagnets are enclosed within a container and wherein the power coils are wound about that portion of the track which passes between the opposite poles.

5. The apparatus of claim 1 wherein said natural energy is wind energy.

6. The apparatus of claim 1 wherein said natural energy is thermal energy derived from solar energy.

7. The apparatus of claim 1 wherein said natural energy is wave energy.

8. Apparatus for generating electrical energy, said apparatus comprising in combination:
   a continuous, non-circular, non-axial track including a pair of continuous, substantially parallel rails;
   a plurality of electromagnets positioned at fixed locations about said track, said electromagnets having at least two magnetically opposite poles, at least one of said poles being located on each side of said pair of rails;
   at least one exciting coil wound about a portion of each of said electromagnets through which is passed a D.C. current to create a magnetic flux in each of said electromagnets;
   at least one power coil wound about a portion of each of said electromagnets and connected for transmission of the generated electrical energy to external collection means;
   a plurality of interconnected ferromagnetic blocks adapted to pass about said non-circular track relative to and at a fixed distance between the opposite poles of said electromagnets to alternately maximize and minimize the flux density present in each of said electromagnets to generate an A.C. current in said power coil, said blocks including oppositely positioned rotatable wheels adapted to ride on the rails of said track and at least one turbine blade-like member to receive natural mechanical energy to effect movement of said blocks about said track; and
   means to focus wind energy towards said apparatus to effect movement of said blocks about said track, said means comprising at least one conically shaped wind concentrator positioned about said track so as to omni-directionally concentrate and direct the velocity of the wind against the turbine blade-like member of said blocks to effect movement of said blocks about said track.

9. The apparatus of claim 8 wherein said conically shaped wind concentrator comprises a conically shaped ring support structure about which is wrapped a sheet-like material.

10. Apparatus for generating electrical energy, said apparatus comprising in combination:
    a continuous, non-circular, non-axial track including a pair of continuous substantially parallel rails;
    a plurality of electromagnets positioned at fixed locations about said track, said electromagnets having at least two magnetically opposite poles, at least one of said poles being located on each side of said pair of rails;
    at least one exciting coil wound about a portion of each of said electromagnets through which is passed a D.C. current to create a magnetic flux in each of said electromagnets;
    at least one power coil wound about a portion of each of said electromagnets and connected for transmission of the generated electrical energy to external collection means;

a plurality of interconnected ferromagnetic blocks adapted to pass about said non-circular track relative to and at fixed distances between the opposite poles of said electromagnets to alternately maximize and minimize the flux density present in each of said electromagnets to generate an A.C. current in said power coils, said blocks including oppositely positioned rotatable wheels adapted to ride on the rails of said track and at least one turbine blade-like member to receive natural mechanical energy to effect movement of said blocks about said track; and means to focus thermal solar energy and convert it into mechanical energy to effect movement of said blocks about said track, said means comprising a solar energy convertor which includes a network of pipes within which a liquid is circulated; means for heating said liquid to at or above its boiling point; means for converting said heated liquid to its vapor state; and means for directing said vapor against said turbine blade-like members to effect movement of said blocks about said track.

11. The apparatus of claim 10 wherein said liquid is water and wherein said means of heating comprises at least one converging lens positioned about a portion of said network of pipes, said lens being adjustably mounted so as to adjust its direction relative to the position of the sun in order to efficiently concentrate the solar energy onto the pipes containing said water.

12. The apparatus of claim 11 further including insulating means to retard heat loss from said network of pipes.

13. Apparatus for generating electrical energy, said apparatus comprising in combination:

a continuous, non-circular, non-axial track including a pair of continuous substantially parallel rails positioned adjacent to a body of water;

a plurality of electromagnets positioned at fixed locations about said track, said electromagnets having at least two magnetically opposite poles, at least one of said poles being located on each side of said pair of rails;

at least one exciting coil wound about a portion of each of said electromagnets through which is passed a D.C. current to create a magnetic flux in each of said electromagnets;

at least one power coil wound about a portion of each of said electromagnets and connected for transmission of the generated electrical energy to external collection means;

a plurality of interconnected ferromagnetic blocks adapted to pass about said non-circular track relative to and at fixed distances between the opposite poles of said electromagnets to alternately maximize and minimize the flux density present in each of said electromagnets to generate an A.C. current in said power coils, said blocks including oppositely positioned rotatable wheels adapted to ride on the rails of said track and at least one turbine blade-like member to receive natural mechanical energy to effect movement of said blocks about said track; and means to focus wave energy from said body of water towards said apparatus to effect movement of said blocks about said track.

* * * * *